(12) United States Patent
Bestgen et al.

(10) Patent No.: US 6,173,281 B1
(45) Date of Patent: Jan. 9, 2001

(54) METHOD AND COMPUTER PROGRAM PRODUCT FOR PROCESSING AND COMBINING DATA SETS INCLUDING BITMAPS

(75) Inventors: Robert Joseph Bestgen, Dodge Center; Thomas Paul Giordano; Barry Warren Knapp, both of Rochester; David Rolland Welsh, Byron, all of MN (US)

(73) Assignee: International Business Machines Corporation, Armonk, NY (US)

( * ) Notice: Under 35 U.S.C. 154(b), the term of this patent shall be extended for 0 days.

(21) Appl. No.: 09/083,802

(22) Filed: May 22, 1998

(51) Int. Cl.$^7$ .................................................. G06F 17/30
(52) U.S. Cl. ........................... 707/7; 707/1; 707/100; 707/200
(58) Field of Search .............................. 707/1, 100, 200, 707/7

(56) References Cited

U.S. PATENT DOCUMENTS

| | | | |
|---|---|---|---|
| 5,745,745 | * | 4/1998 | Tada et al. ........................... 395/601 |
| 5,884,307 | * | 3/1999 | Depledge et al. .................... 395/601 |
| 5,940,833 | * | 8/1999 | Benson .................................. 707/100 |
| 5,963,935 | * | 10/1999 | Ozbutun et al. ......................... 707/3 |
| 5,987,221 | * | 11/1999 | Bearss et al. .......................... 395/109 |
| 6,023,696 | * | 2/2000 | Orborn et al. ............................ 707/3 |

* cited by examiner

Primary Examiner—Thomas G. Black
Assistant Examiner—Thuy Do
(74) Attorney, Agent, or Firm—Joan Pennington

(57) ABSTRACT

A method and computer program product are provided for processing and combining data sets including bitmaps in a computer system. A plurality of initial data subsets to be combined are processed and data structure statistics containing predefined data attributes are built for each of the plurality of initial subsets. Checking for a dynamic selection attribute for each of the plurality of initial subsets is performed. Responsive to the dynamic selection attribute not being identified, the intermediate storage requirements for producing the combined final data set is selectively optimized. Responsive to identifying the dynamic selection attribute, both intermediate result regeneration and intermediate storage requirements for producing a combined final data set are selectively optimized.

10 Claims, 8 Drawing Sheets

METHOD AND COMPUTER PROGRAM PRODUCT FOR PROCESSING AND COMBINING DATA SETS INCLUDING BITMAPS

FIELD OF THE INVENTION

The present invention relates to the data processing field, and more particularly, relates to a method and computer program product for processing and combining data sets including bitmaps in a computer system.

DESCRIPTION OF THE RELATED ART

A common data source, such as a database file can be very large and processing and combining data sets from the data source can be expensive in terms of computer resources. It is important that methods for processing and combining data sets be efficient. Various methods are provided to indicate how a data set or record subset is to be derived, such as, an existing user provided bitmap, where each ON bit indicates a record that should be returned. A second method could be referencing a previously related object, such as a keyed or encoded vector index, along with methods to indicate how to derive the elements of the data set. A third method could use a start and end value that may be provided at create time, where all entries between the two values are to be included in a record subset. Similarly a method may be provided to identify at a later date a start and end value. A list may be provided of specific record numbers of interest in a database file. When accessing records in a database, a data object, for example, a cursor on the DB2/400 database implemented in the International Business Machines Corp. AS/400 computer system, is often used to keep track of the position in that database. On the DB2/400 database, the selection cursor can be built with imbedded complexity, such that the cursor automatically skips records which do not fit a selection criteria. This complexity is built in when the cursor is created.

Multiple methods for building selection and implementing selection exist. After subsets of data records are selected using diverse indexes or other methods, these subsets may need to be combined with boolean operators, such as logically ANDed or ORed together, to produce a desired final result data set. In the process of producing the desired final result data set, the derivation of record subsets should be kept to a minimum. A need exists for an efficient and effective computer implemented method for processing and combining data sets from a common data source, such as bitmaps from a database file.

SUMMARY OF THE INVENTION

A principal object of the present invention is to provide an improved method and computer program product for processing and combining data sets including bitmaps in a computer system. Other important objects of the present invention are to provide such method and computer program product for processing and combining data sets substantially without negative effects and that overcome some disadvantages of prior art arrangements.

In brief, a method and computer program product are provided for processing and combining data sets including bitmaps in a computer system. A plurality of initial data subsets to be combined are processed and data structure statistics containing predefined data attributes are built for each of the plurality of initial subsets. Checking for a dynamic selection attribute for each of the plurality of initial subsets is performed. Responsive to the dynamic selection attribute not being identified, the intermediate storage requirements for producing the combined final data set is selectively optimized. Responsive to identifying the dynamic selection attribute, both intermediate result regeneration and intermediate storage requirements for producing a combined final data set are selectively optimized.

BRIEF DESCRIPTION OF THE DRAWING

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
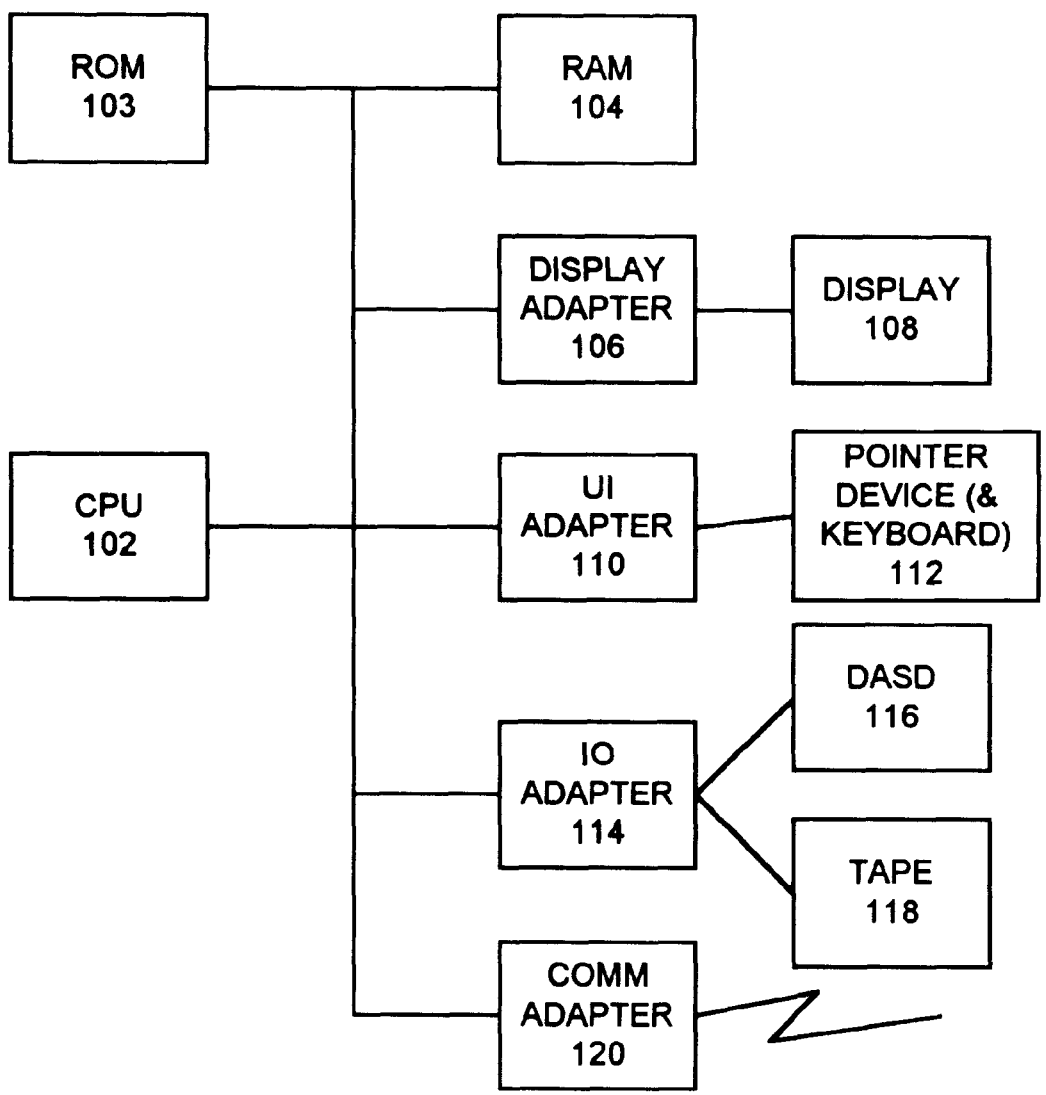
FIGS. 1 and 2 are block diagram representations illustrating a computer system and operating system for implementing a method and computer program product for processing and combining data sets including bitmaps in accordance with the preferred embodiment.
Figure 2:
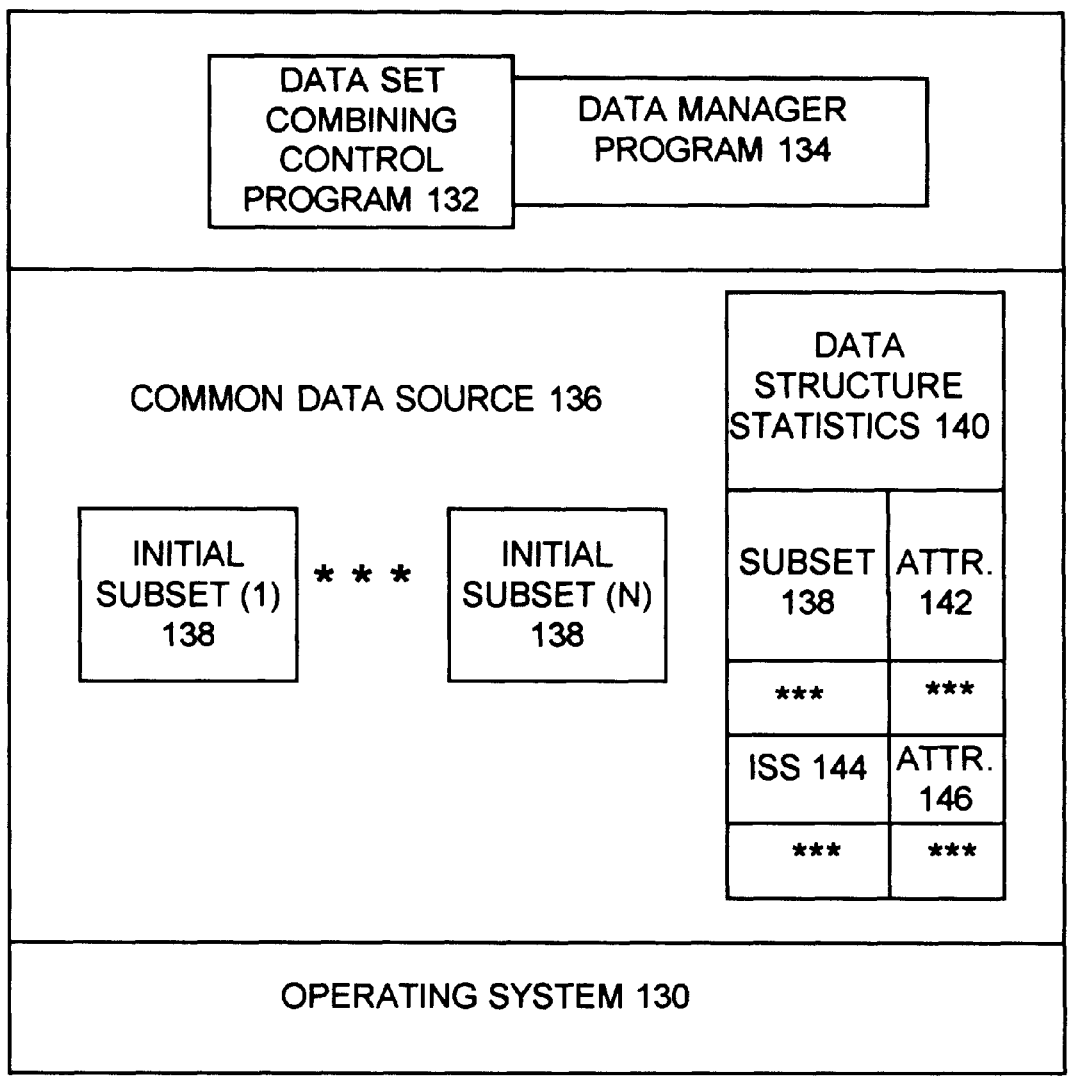

Having reference now to the drawings, in FIGS. 1 and 2, there is shown a computer or data processing system of the preferred embodiment generally designated by the reference character 100. As shown in FIG. 1, computer system 100 includes a central processor unit (CPU) 102, a read only memory 103, a random access memory 104, and a display adapter 106 coupled to a display 108. CPU 102 is connected to a user interface (UI) adapter 110 connected to a pointer device and keyboard 112. CPU 102 is connected to an input/output (IO) adapter 114 connected to a direct access storage device (DASD) 116 and a tape unit 118. CPU 102 is connected to a communications adapter 120 providing a communications function. It should be understood that the present invention is not limited to a computer model with a single CPU, or other single component architectures as shown in FIG. 1.

As shown in FIG. 2, computer system 100 includes an operating system 130, a data set combining control program 132 of the preferred embodiment used in conjunction with a data manager program 134. A common data source 136 includes multiple initial data sets (1–N) 138. Data structure statistics 140 are built and stored for each subset 138 including predetermined attributes 142 and for each intermediate subset 138 including predetermined attributes 146.

Given N initial sets 138 that describe patterns or selected items from the common source 136 and those sets 138 are to have logical operations applied to them, a method of the preferred embodiment logically combines initial subsets 138 into a single final result set. When the selection criteria applied to generate a given initial set 138 is dynamic in nature, one may or may not be required to rebuild any or all of the initial, intermediate or final sets. In the description of the preferred embodiment, an example used for the common data source type 136 is a database file and the subsets 138 and intermediate subsets 144 are bitmaps. However, it should be understood that the data source 136 may be any collection of data and the sets 138 may be any structure chosen to contain items to identify selected or desired elements from the common source 136.

Various operators are provided to combine the identified record subsets including for example, a logical AND operator, a logical OR operator, a logical NOT operator, and a logical XOR operator. With a logical AND operator, a combined resulting set includes every record included in both initial subset 1 and subset 2. In accordance with the preferred embodiment, the AND operator is extended by providing a low threshold, such that if either of the initial subsets has less than the set low threshold number of records, that initial subset is used as is, rather than processing this AND request or further subsets on the stack which all have the AND operator. With a logical OR operator, every record that is in either subset 1 or in subset 2 is in the result set. A high threshold mechanism also is provided to allow for avoiding this OR request or further subsets on the stack which all have the OR operator if either of the initial subsets has more than the high threshold number of records, and instead using the full data source 136.

Various commercially available processors could be used for computer system 100, for example, an IBM personal computer or similar workstation can be used. An example of a specific computer system on which the invention may be implemented is the International Business Machines Corp. AS/400 computer system. Central processor unit(s) 102 is suitably programmed to execute the flowcharts of FIGS. 3–7, to process and combine sets of the preferred embodiment. Control program 132 provides the suitable programming for the central processor unit 102 to perform the methods of the preferred embodiment.

Figure 3:
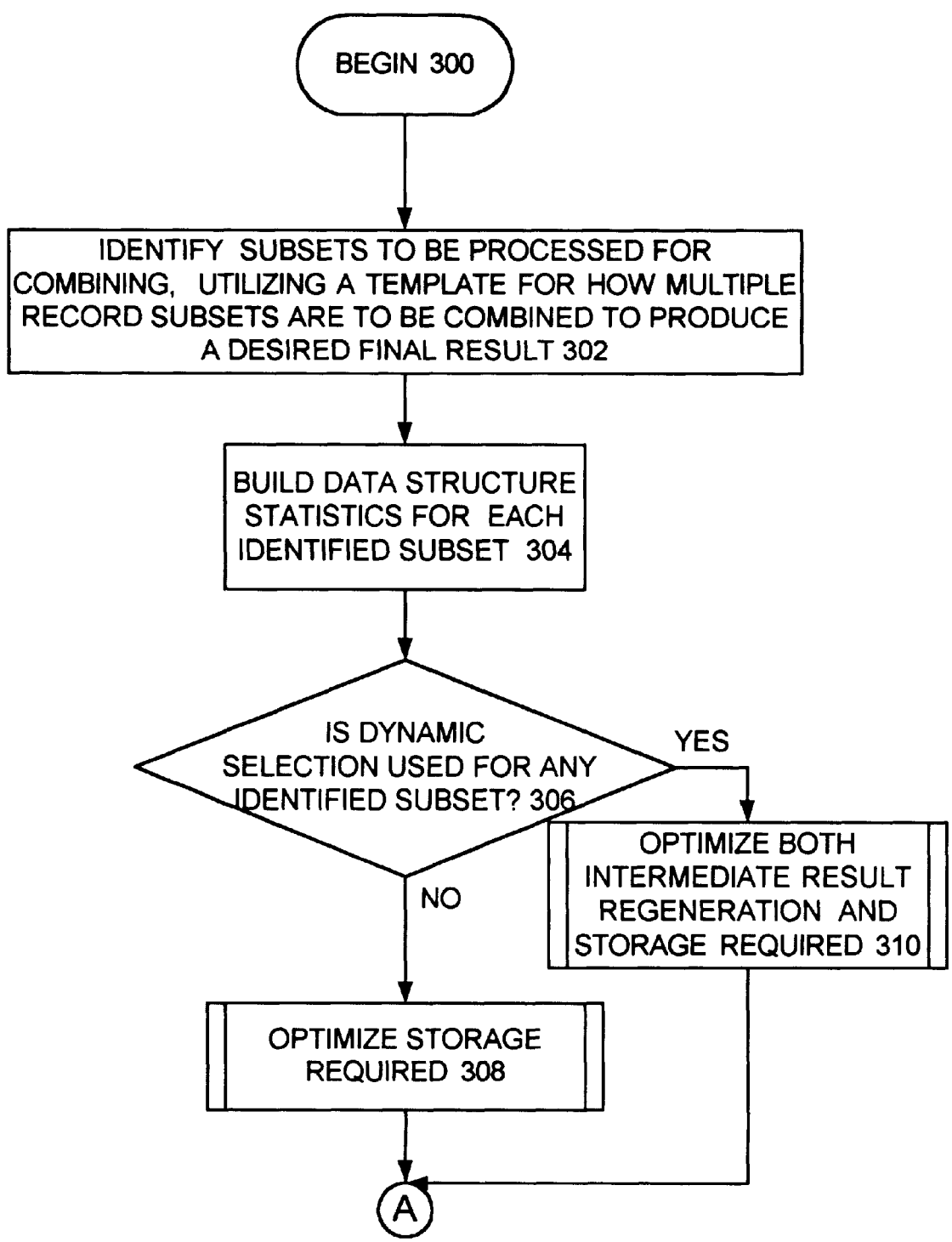
FIGS. 3, 4 and 5 are flow charts illustrating exemplary steps for processing and combining sets including bitmaps in accordance with the preferred embodiment.
Figure 4:
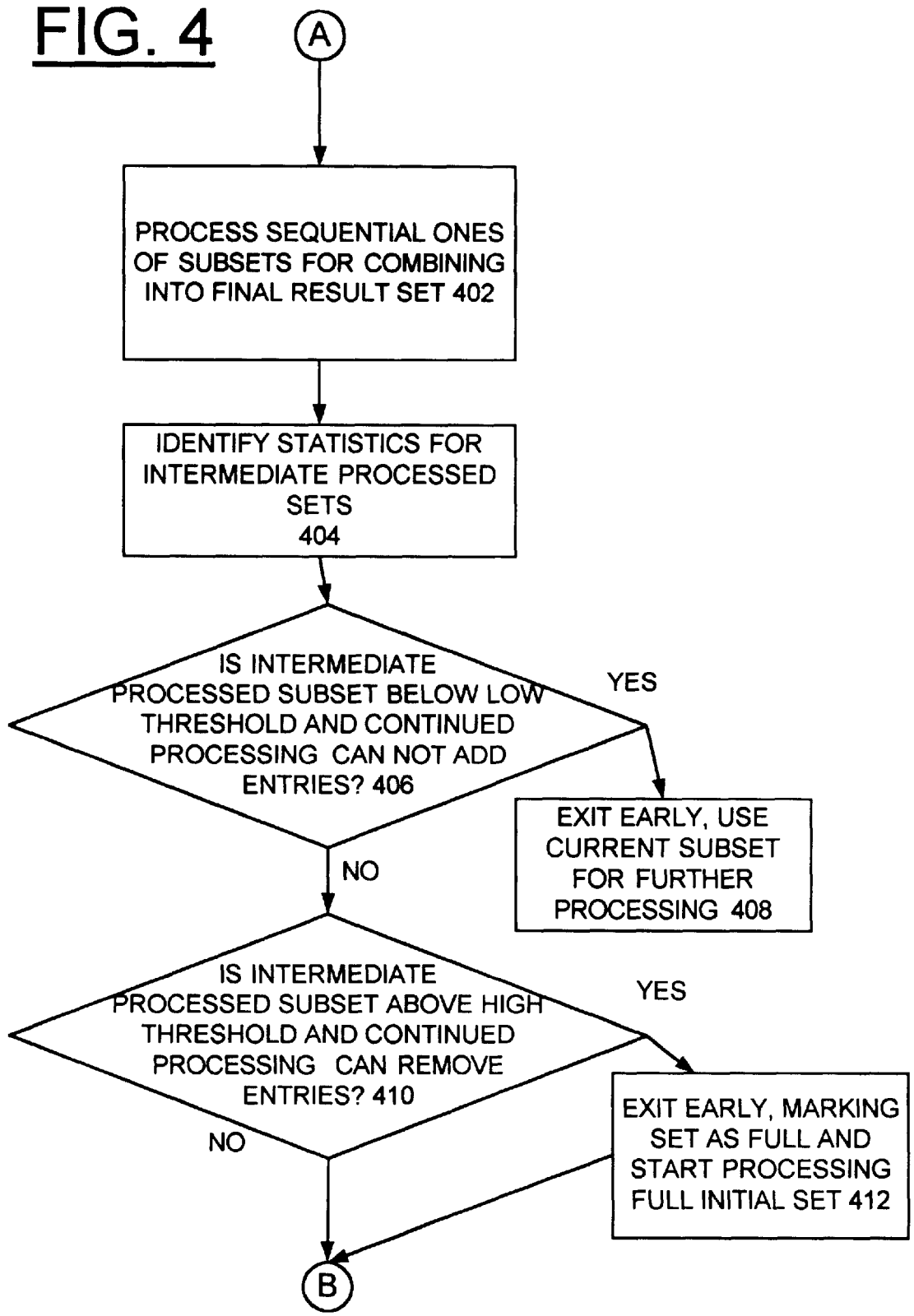
Figure 5:
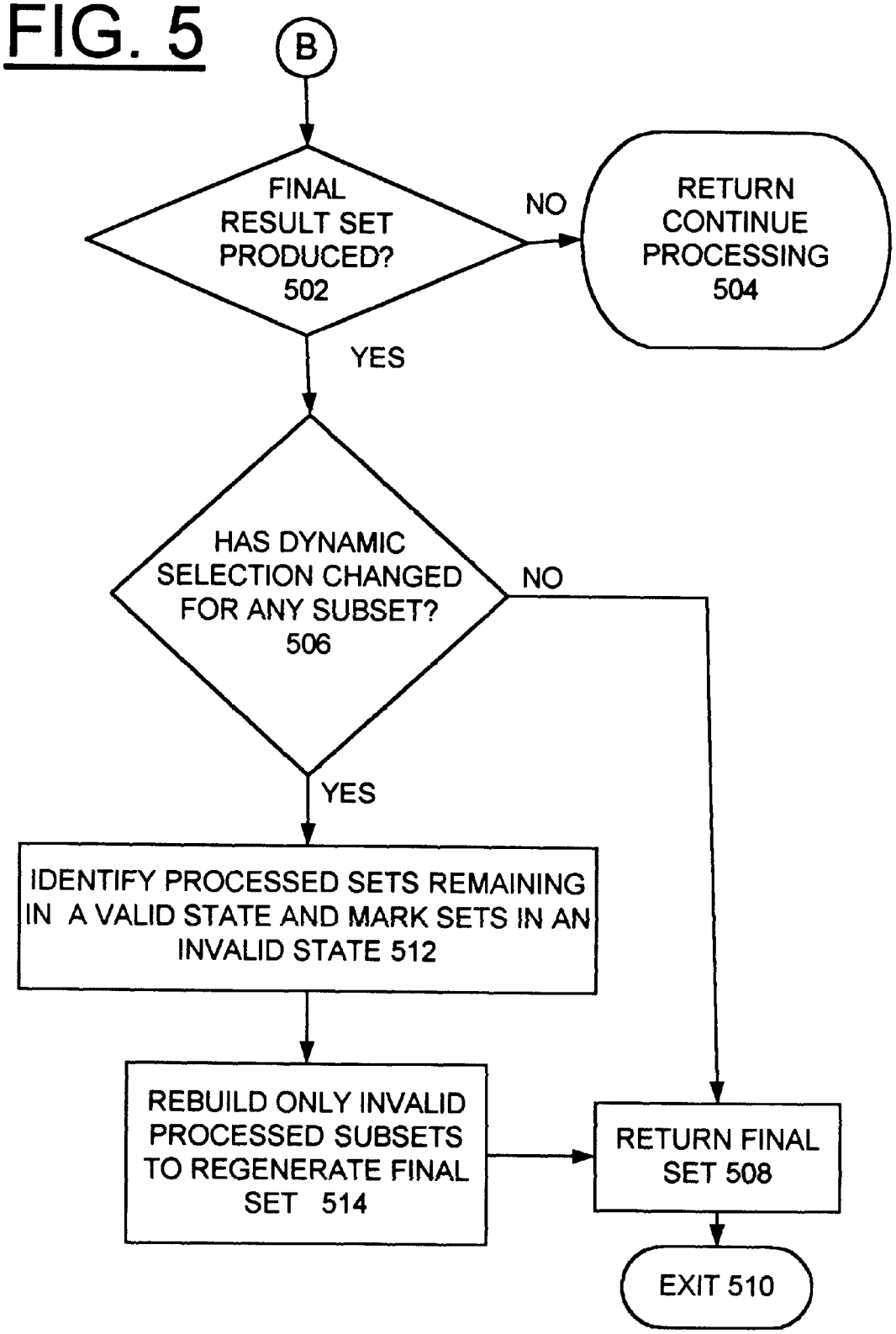

In accordance with features of the preferred embodiment, as illustrated and described with respect to FIGS. 3, 4, and 5, a method processes and combines record subsets which are needed to produce a final result set. Thresholds are provided so that much processing can be avoided as illustrated and described with respect to FIG. 4. As illustrated and described with respect to FIGS. 3 and 7, also provided is a method where a primitive record subset can reference dynamic fields as a part of its derivation. Record subset specific code is provided within the data structure attributes 144 to identify if those dynamic fields have changed, and the record subset needs to be rederived. This rederivation can affect subsets produced by logically combining this dynamic subset and another subset. This contingency is handled efficiently. As illustrated and described with respect to FIGS. 6 and 7, also provided is a method to identify when combination of one or more subsets can be derived onto one of the source subsets, or whether it would be more efficient overall to produce a separate subset. Taken into consideration is if the primitive record subsets reference dynamic fields, and which fields are referenced.

Referring now to FIGS. 3, 4 and 5 there are shown flow charts illustrating exemplary steps for processing and combining data sets including bitmaps in accordance with the preferred embodiment. In FIG. 3, sequential steps begin at a block 300. As indicated at a block 302 subsets to be processed for combining are identified using a template that is provided to indicate how multiple subsets of records are to be combined to produce the final result.

Data structure statistics 140 are built to indicate how each selected subset of records is derived as indicated at a block 304. As indicated at a decision block 306, checking is performed to determine whether dynamic selection is used for any identified subset. If dynamic selection is not used for any identified subset, then optimization of required intermediate and result storage is performed as indicated at a block 308. The storage optimization routine used with all static subsets is illustrated and described with respect to FIG. 6. If dynamic selection is used for any identified subset, then optimization of intermediate result regeneration and optimization of required intermediate and result storage is performed as indicated at a block 310. The storage optimization routine used with any dynamic subsets is illustrated and described with respect to FIG. 7.

In FIG. 4, processing sequential ones of the subsets is performed as indicated at a block 402. Statistics for the intermediate processed sets are identified as indicated at a block 404. When producing the final record subset, efficiencies are used. A straightforward method would build all of the record subsets, and perform the desired logical operators on them. In accordance with the preferred embodiment, an early exit is provided when full processing of all input sets can be terminated early when the current intermediate result contains a very high or very low number of items, and the remaining steps cannot affect the result set in the opposite direction. For example, when the current intermediate set is empty and further processing cannot add entries, an early exit is provided. When the current intermediate set approaches a defined high threshold and applying additional sets can only increase the set size, also an early exit is provided, marking the result set as full.

As indicated at a decision block 406, checking is performed to determine whether a current intermediate processed subset is below a low threshold and continued processing can not add entries. If the current intermediate processed subset is below a low threshold and continued processing can not add entries, then an early exit is provided and the current subset is used for further processing as indicated at block 408. As indicated at decision block 410, checking is performed to determine whether a current intermediate processed subset is above a high threshold and continued processing can not reduce the number of entries. If the current intermediate processed subset is above a high threshold and continued processing can not reduce the number of entries, then an early exit is provided and the full initial data set is used for further processing as indicated at a block 412.

As an example, assume four sets are identified at block 302 of which the desired final result is the Boolean OR of all of the four sets. The minimum result size can be the amount of items represented in the largest set. Also, the maximum number of items that will be in the result set is the smaller of: everything in the data source 136, or the sum of all items represented in the four sets. By keeping statistics of items in our current result set as each set is processed, when a threshold is reached, say 80%, we stop processing the result sets, and process the entire data source 136. Thus, if N sets A, B and C are combined, and they yield 80% or more items as compared to the full data source 136, processing is stopped early. In this case, processing the other set D could only add, and never reduce the result set, since the operation being applied to the four initial sets is the Boolean OR. Thus, processing set D can be bypassed, and the full result set processing can begin.

In FIG. 5, the final result data set is identified as indicated at a decision block 502, otherwise as indicated at block 504 processing is continued as shown in FIG. 4. When the final result data set is identified, checking whether the dynamic selection has changed for any of the initial subsets is performed as indicated at decision block 506. If not, then the final set is returned as indicated at block 508 to complete the combining method as indicated at a block 510. Otherwise when the dynamic selection has changed for any of the initial subsets, then processed sets remaining in a valid state are identified and invalid sets are marked as indicated at a block 512. Only invalid processed subsets are rebuilt to regenerate the final set as indicated at a block 514. Then the final set is returned at block 508.

Any dynamic selection change is identified at block 506. When new dynamic selection is applied to one or more of the initial sets, the current result set may be unaffected or require full generation. Knowing the affects of the new selection on the initial and intermediate sets when building and maintaining the result set can greatly reduce the processing required to build the new result set. In fact this may entirely eliminate any processing required. Data structures which contain various attributes necessary for processing the sets and applying a stack-type of algorithm to process the data structures that described each set.

For example, assume initial sets of A, B, C and D are combined to produce a final result set, where A, B, and C are built with static selection and D is built with dynamic selection.

When we initially build the result set in this manner:
(1) A,B→A'
(2) A',C→A"
(3) A",D→D'

When D receives new dynamic selection, reprocessing is required to determine the new final result set. Pass one of the set attribute data structures will determine the following:
First A, B, A', C, and A" remain valid and are left in a valid state.

However, D may be invalid. Its new dynamic selection is tested, and for this example, we will require the full set in D to be rebuilt. The step above also invalidates D'. The second pass, which is the same algorithm that was used to process the sets the very first time is then performed. However, this second pass will not process those initial sets and intermediate sets that are in the valid state. From the example above, A,B→A' and A',C→A" are not performed and A" is used as is to build the new D' from the newly modified D due to applying the dynamic selection.

As described with respect to FIG. 2, data structure statistics 140 are maintained so that various attributes 142 of each initial subset 138 and each intermediate subset 144 are stored. One such attribute, is a mechanism specifically for dynamic selection. When the first set of selection, dynamic or static, is applied to build the initial subset 138, result characteristics are stored for that set. This data will then be used when the dynamic selection inputs change. Applying this information to the new selection input is used to determine if the set is affected by the new selection. In those instances in which the dynamic selection changes, but that change does not affect the content of the current subset 138 or intermediate subset 144, the current subset 138 or intermediate subset 144 is reused.

During the maintenance of the result set at block 506, 512, and 514 of FIG. 5, the attributes 142 and 146 of the initial data structures 138 and intermediate data structures 144 are traversed to validate each initial subset 138 and the intermediate result subsets 144. Each initial subset 138 that become invalid, and those intermediate result subsets 144 which the initial subset 138 affects, are marked as requiring rebuild. Once the initial pass has been complete, the algorithm used to build the result set is applied, but this processing only requires rebuilding of invalid sets at block 514.

Figure 6:
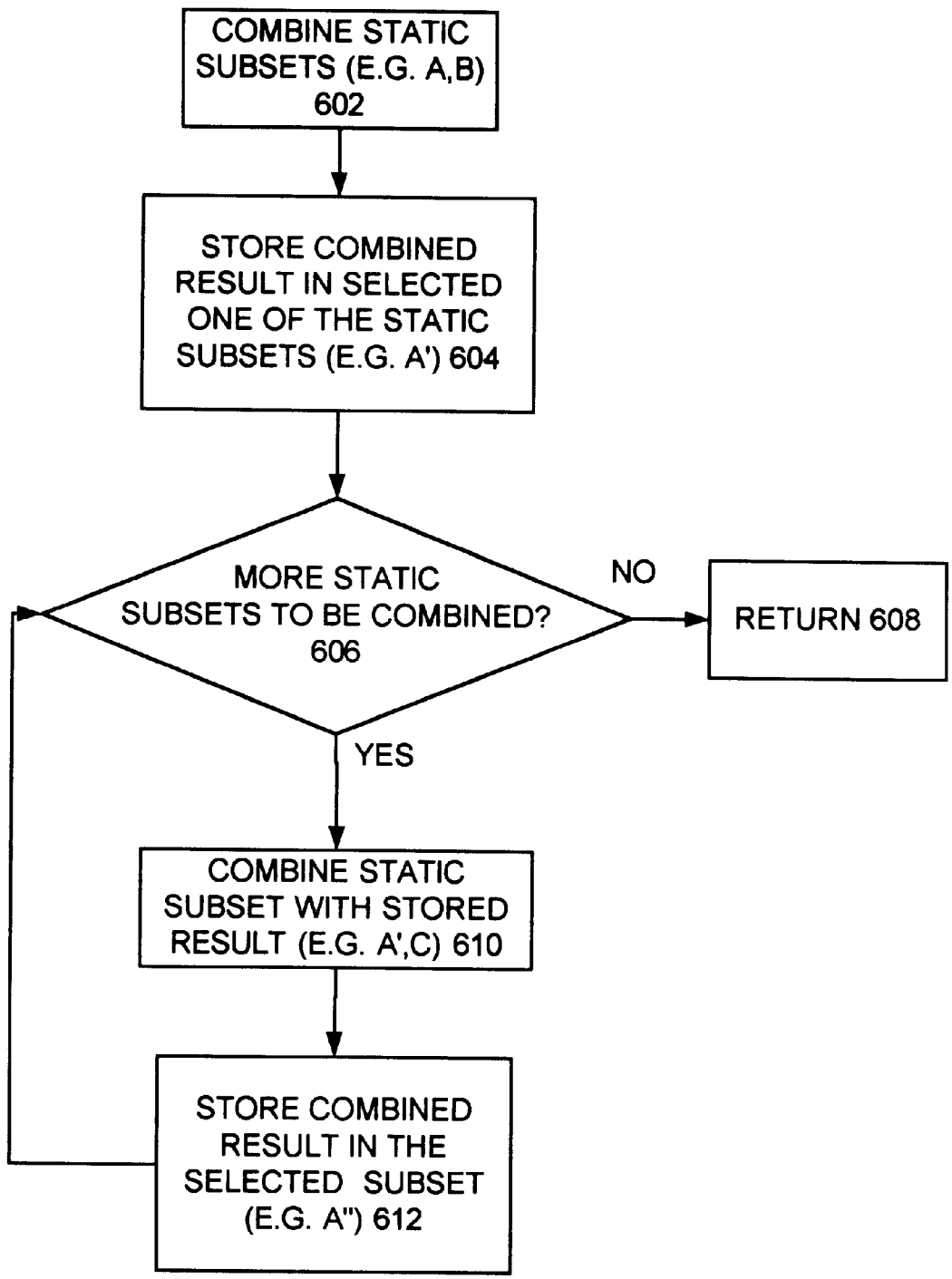
FIG. 6 is a flow chart illustrating exemplary steps for optimizing storage requirements for storing intermediate results from combining data sets including bitmaps in accordance with the preferred embodiment.
Figure 7:
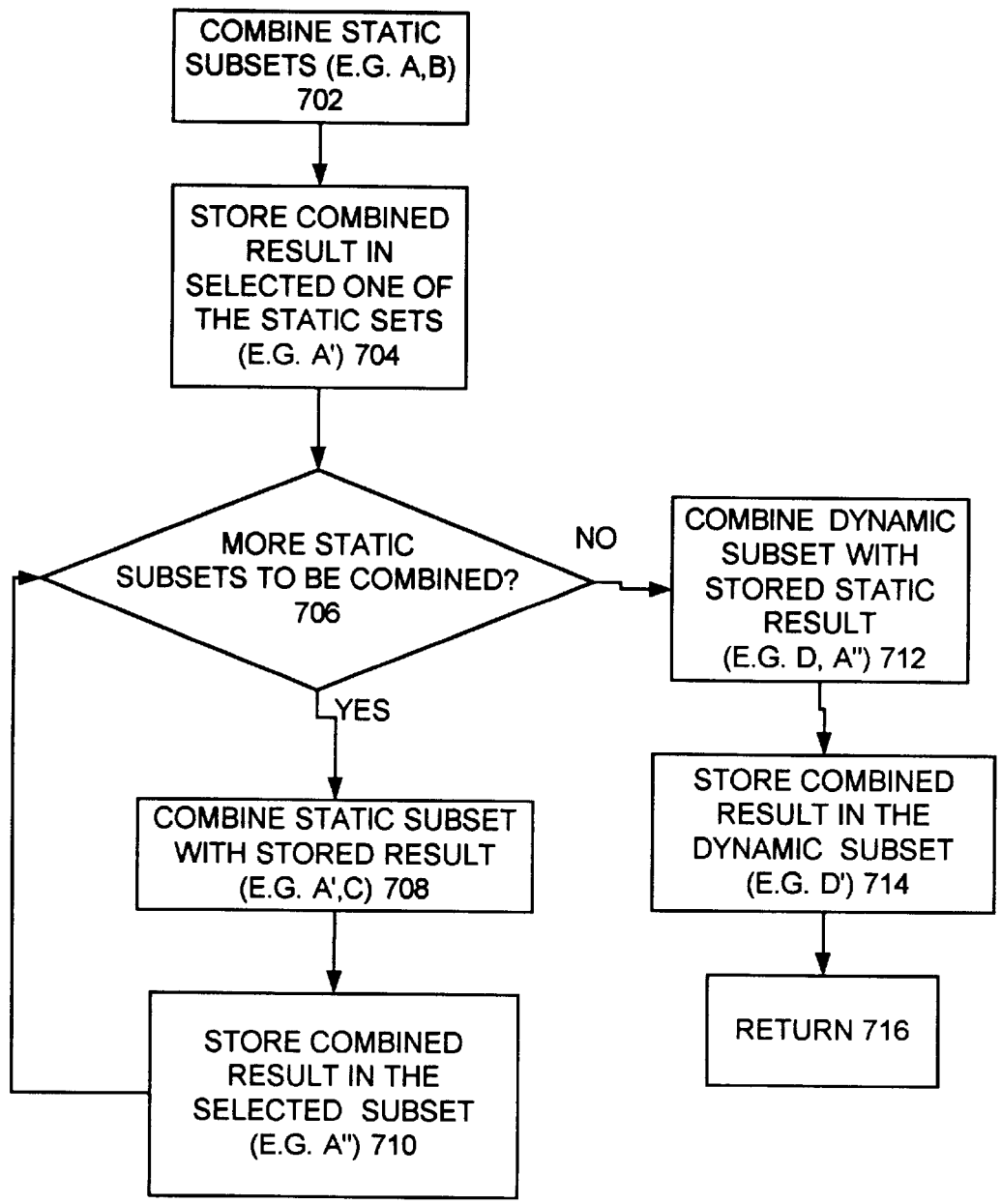
FIG. 7 is a flow chart illustrating exemplary steps for optimizing both intermediate result regeneration and storage requirements for storing intermediate results from combining data sets in accordance with the preferred embodiment.

Referring to FIGS. 6 and 7, respective sequential steps are shown for reducing intermediate result storage containers. Typically when given N initial sets, N−1 temporary sets may be required to determine the final result. For example, assume three sets, A, B and C, are to be combined, one may use a fourth set, X, to combine A and B and a fifth set, Y, to combine X & C represented as follows:
(1) A,B→X
(2) X,C→Y Referring to FIG. 6, there is illustrated a method in accordance with the preferred embodiment where the storage required may be fully optimized, using only the N bitmaps. When A, B and C are combined, A and B are combined and the result of A and B is put into A (call it then A') as indicated at blocks 602 and 604 then A' and C are combined as indicated at a block 610, putting their result into A' (now referred to A") as indicated at a block 612 represented as follows:
(1) A,B→A'
(2) A',C→A"

This method illustrated in FIG. 6 eliminates the need for any extra storage, the initial data structure A is used as the output of an operation for the two different steps.

Referring now to FIG. 7, when one or more of the initial sets is constructed using dynamic selection where selection is given inputs that affect the result set, and the bitmap results are to be reused for multiple dynamic selection inputs, a combination of storage areas, additional temporary results as well as initial results are used.

For example, assume initial sets of A, B, C and D, assume A, B, and C are built with static selection or no input to affect its output and assume D is built with dynamic selection or having an input provided that when changes, generates different set results.

The result set is built in the following manner:
(1) A,B→A'
(2) A',C→A"
(3) A",D→D'

Either A or B can be used for the result of steps one and 2 indicated at a blocks 702, 704, 708, 710. However, we benefit greatly when the result in step two at block 710 is not used as the result container of step three indicated at block 712. The result container of step 3 is the dynamic subset D' as indicated at a block 714. Since A, B, and C are built with static selection, and when the dynamic selection is applied to rebuild bitmap D, the new result of A, B, C, and D can be defined by only performing the third step, thus bypassing the processing required to build the intermediate resulting sets A' and A" in steps one and two.

Thus, reusing storage containers in which static selection has been applied while preserving intermediate result values of static selection steps in conjunction with dynamic selection sets can reduce processing required to rebuild result sets after applying dynamic selection to one or more sets.

While the illustrated example of FIG. 7 uses four bitmaps, and only one bitmap D is dynamic, one can appreciate the benefits of this processing method when the number of initial sets N is large and the processing required to regenerate the result set upon the changing of dynamic selection criteria can be greatly reduced.

Figure 8:
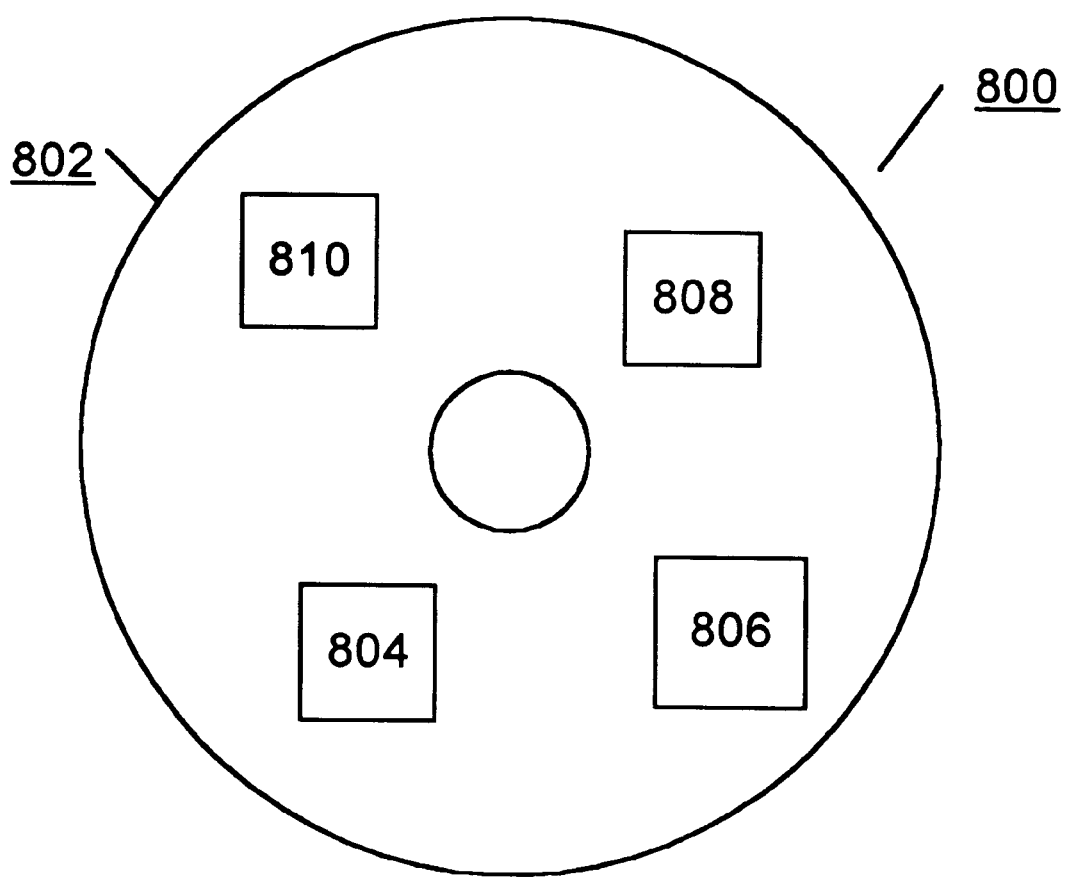
FIG. 8 is a block diagram illustrating a computer program product in accordance with the preferred embodiment.

Referring now to FIG. 8, an article of manufacture or a computer program product 800 of the invention is illustrated. The computer program product 800 includes a recording medium 802, such as, a floppy disk, a high capacity read only memory in the form of an optically read compact disk or CD-ROM, a tape, a transmission type media such as a digital or analog communications link, or a similar computer program product. Recording medium 802 stores program means 804, 806, 808, 810 on the medium 802 for carrying out the methods for combining data sets of the preferred embodiment in the system 100 of FIGS. 1 and 2.

A sequence of program instructions or a logical assembly of one or more interrelated modules defined by the recorded program means 804, 806, 808, 810, direct the computer system 100 for logically combining data sets into a final result set of the preferred embodiment.

While the present invention has been described with reference to the details of the embodiments of the invention shown in the drawing, these details are not intended to limit the scope of the invention as claimed in the appended claims.

What is claimed is:

1. A method for identifying and combining sets including bitmaps in a computer system comprising the steps of:

identifying a plurality of initial data subsets to be combined;

building data structure statistics containing predefined data attributes for each of said plurality of initial subsets;

checking for a dynamic selection attribute for each of said plurality of initial subsets;

responsive to said dynamic selection attribute not being identifying, selectively optimizing said intermediate storage requirements for producing a combined final data set; and sequentially combining selected ones of said plurality of initial data subsets providing sequential combined results and comparing a current combined result with at least one predefined threshold.

2. A method for identifying and combining sets including bitmaps in a computer system as recited in claim 1 includes the step of responsive to identifying said dynamic selection attribute, selectively optimizing both intermediate result regeneration and intermediate storage requirements for producing said combined final data set.

3. A method for identifying and combining sets including bitmaps in a computer system as recited in claim 2 wherein the step responsive to identifying said dynamic selection attribute, of selectively optimizing both intermediate result regeneration and intermediate storage requirements for producing said combined final data set includes the steps of combining sequential static subsets of said plurality of initial data subsets, storing combined results for static subsets in a selected one of said initial static data subsets; and storing combined results for a dynamic subsets in a selected dynamic one of said initial dynamic data subsets.

4. A method for identifying and combining sets including bitmaps in a computer system as recited in claim 1 wherein the step responsive to said dynamic selection attribute not being identifying, of selectively optimizing said intermediate storage requirements for producing said combined final data set includes the steps of combining sequential ones of said plurality of initial data subsets and storing combined results in a selected one of said initial data subsets.

5. A method for identifying and combining sets including bitmaps in a computer system as recited in claim 1 includes the step of providing an early exit responsive to predefined compared values.

6. A method for identifying and combining sets including bitmaps in a computer system as recited in claim 1 includes the step of providing an early exit responsive to said current combined result being less than a low threshold.

7. A method for identifying and combining sets including bitmaps in a computer system as recited in claim 1 includes the step of providing an early exit responsive to said current combined result being greater than a high threshold.

8. A computer program product for use in a computer system comprising:

a recording medium;

means, recorded on the recording medium, for identifying a plurality of initial data subsets to be combined;

means, recorded on the recording medium, for building data structure statistics containing predefined data attributes for each of said plurality of initial subsets;

means, recorded on the recording medium, for checking for a dynamic selection attribute for each of said plurality of initial subsets;

means, recorded on the recording medium, responsive to said dynamic selection attribute not being identifying, for selectively optimizing said intermediate storage requirements for producing a combined final data set; and means, recorded on the recording medium, for sequentially combining selected ones of said plurality of initial data subsets to provide sequential combined results and for comparing a current combined result with at least one predefined threshold.

9. A computer program product as recited in claim 8 further includes means, recorded on the recording medium, responsive to identifying said dynamic selection attribute, for selectively optimizing both intermediate result regeneration and intermediate storage requirements for producing said combined final data set.

10. A computer program product as recited in claim 8 further includes means, recorded on the recording medium, for providing an early exit responsive to predefined compared values.

* * * * *